May 11, 1965 J. R. LISOWSKI 3,183,483

ERROR DETECTION APPARATUS

Filed Jan. 16, 1961 3 Sheets-Sheet 1

INVENTOR
JOHN R. LISOWSKI

BY Thomas J. Nikolai
AGENT

May 11, 1965 J. R. LISOWSKI 3,183,483

ERROR DETECTION APPARATUS

Filed Jan. 16, 1961 3 Sheets-Sheet 2

INVENTOR
JOHN R. LISOWSKI

BY
Thomas J. Nikolai
AGENT

May 11, 1965 J. R. LISOWSKI 3,183,483

ERROR DETECTION APPARATUS

Filed Jan. 16, 1961 3 Sheets-Sheet 3

INVENTOR
JOHN R. LISOWSKI
BY Thomas J. Nikolai
AGENT 3,183,483

ERROR DETECTION APPARATUS

John R. Lisowski, Minneapolis, Minn., assignor to Sperry Rand Corporation, New York, N.Y., a corporation of Delaware Filed Jan. 16, 1961, Ser. No. 82,868
4 Claims. (Cl. 340—146.1)

This invention relates to parity error checking devices for binary-coded data-processing systems.

In binary coded data processing systems the information to be processed is in the form of a plurality of binary signals commonly referred to as bits. Each of the bits is capable of attaining two stable signal states, with each state arbitrarily being designated a "1" or a "0" according to the signal state. In the process of handling the information in a data processing system it is important to maintain a close check for occurrence or presence of any errors. One of the most commonly used and well-known error detection systems is what is known in the art as parity error detection. Briefly, this system involves the use of a non-information bit, a parity bit, in conjunction with a group of data bits, often the group of data bits comprise a data word. Because each of the bits is only capable of being in the "1" or the "0" state, the quantity of "1's" in a given group of bits can be determined. For example, the four bit binary word which is equivalent to decimal 10 would be 1010 which contains an even number of "1's" whereas the four bit binary word which is the equivalent of decimal 11 is 1011 which contains an odd number of "1's." In parity error detection systems the added parity bit will be a"1" or a "0" depending upon whether odd parity or even parity is arbitrarily pre-selected as the basis for parity error detection. For example, assuming the binary equivalent of decimal 10, 1010, and further assuming odd parity is preselected, a fifth non-information bit, the parity bit, will be a "1" so that the result will be a five bit binary word 11010 which contains an odd number of "1's." For decimal 11 the parity bit would be "0" since the binary equivalent of decimal 11 contains an odd number of "1's." If any of the bits were to change erroneously to the opposite signal state there would be an even number of "1's" in the word thereby resulting in a parity error. In copending application by Jallen, S.N. 714,890, now Patent No. 3,142,817, filing date February 12, 1958, assigned to the same assignees as this application, there is described apparatus for determining which signal state, "1" or "0," the partity bit should be placed in and also there is described apparatus for detecting the presence of a parity error.

One example of the use of parity error detection is in relation to the transmission of binary data from a magnetic tape storage device to a computer which is to process the transmitted data. In such apparatus a binary word may be divided up into groups of bits, each group being arranged in a line across the width of the tape, that is, transverse to the tape. The number of lines of bits is dependent upon the word size and the number of bits in each line. In addition to the data bits which form the binary word, each line of bits has associated with it a parity bit so that a parity error in each individual line of bits can be detected in accordance with the system briefly described above. All of the bits in the binary word are contained in a series of lines of bits. The arrangement of the bits in this manner on the tape results, in addition to the series of lines transverse to the tape, in a series of columns or channels of bits running longitudinal or lengthwise to the tape. In this manner the bits of the word are thereby arranged in an array of channels and lines. As each of the series of lines is read or sensed the line parity is checked and the presence of a parity error indicates that one of the bits in the particular line is in the wrong signal state. The detection of this error can then be used to generate an error indicating signal to indicate that an error exists in the specific line.

One of the deficiencies of the above described system is that the detection of a parity error in a line of bits does not indicate which one of the group of bits in the line is in error. Therefore it is necessary to check all of the bits in that line in order to determine which particular bit is in error to be able to correct the signal state of the erroneous bit. An additional drawback exists in the fact that if an even number of the bits in a line have the erroneous signal state there will result no detection of a parity error. There have been parity error detection devices developed in which the particular bit of a group of bits containing an error can be detected, however those devices require more than a single parity bit for each group of data bits, the number of parity bits being dependent on the number of data bits. This requires utilization of a large number of non-information bits.

In this invention there is provided, for binary data which is arranged in an array of lines and channels of bits, a line of parity bits containing a parity bit for each channel of data bits in addition to a channel of parity bits containing a parity bit for each line of data bits. In this manner, channel parity errors as well as line parity errors can be detected. Each line of bits is checked line-by-line for parity error and each channel is checked for parity error, including the line of channel parity bits and the channel of line parity bits. The results of these checks are then combined in such a manner as to indicate which specific bit in the array of data bits is in error and this indication is then used to correct that erroneous bit by changing it to its correct signal state. If an even number of bits in a line are in error so as not to be detectable by the line parity error detection circuit there still will result detection of a channel parity error. Similarly, if an even number of bits in a channel are in error, even though the channel parity error detection circuit will not indicate the presence of an error, the line parity error detection circuit will indicate said errors. It should be noted here that one combination of data bit errors will not be detected and that is where the line and channel coordinate position of these errors appear as four corners of a rectangle. But it should be further noted that the chances of this combination occurring is extremely remote. In addition, the parity check of the channel-parity line and the line-parity channel will indicate if any of the parity bits are in error.

It is an object of this invention to provide an improved parity error checking apparatus for binary coded systems.

It is another object of this invention to provide parity checking apparatus for indicating substantially all errors that occur in binary coded information.

Still a further object of this invention is to provide parity checking apparatus for determining which particular data bit is in error.

Still another object of this invention is to provide means for correcting a particular bit that is in error.

Yet another object of this invention is to provide means for detecting errors in parity bits.

These and other more detailed and specific objects will be disclosed in the course of the following specification, reference being had to the accompanying drawings, in which.

Figures 1, 1A:
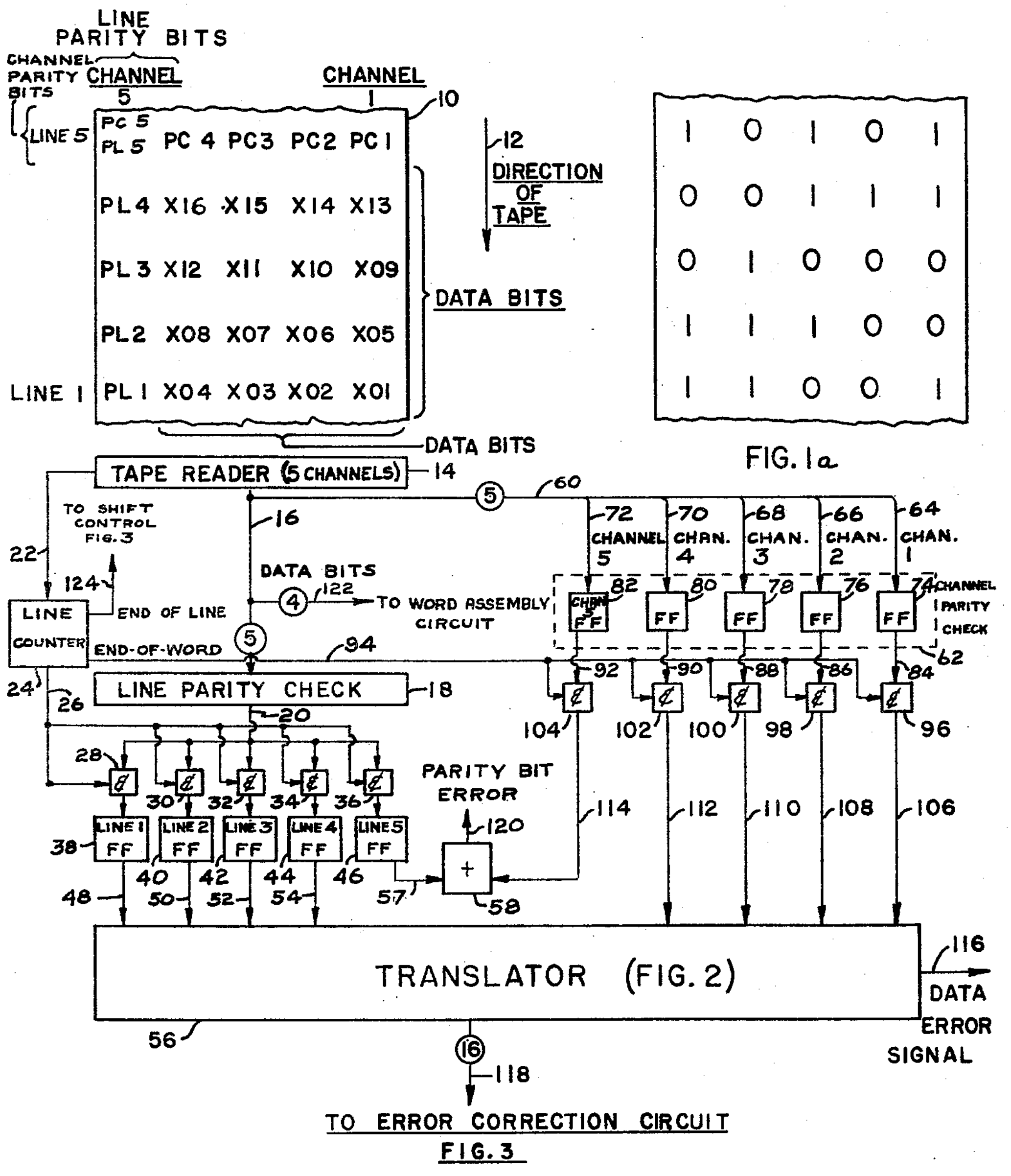
FIGURE 1 shows in block diagram form an embodiment of this invention for detecting the presence of errors in binary data.
FIGURE 1*a* shows an array of bits on a magnetic tape with arbitrarily selected binary values for the word or data bits.

The embodiment of this invention shown in FIGURE 1 and described in detail in the specification, relates to the transmission of binary coded data from a magnetic tape 10 to a utilization device such as a binary data processor or computer. A binary word comprising bits labelled $X_{01}$–$X_{16}$ is stored on the tape in an array of lines and channels of bits wherein the lines of bits are transverse or across the width of the tape and the group of bits comprising a channel run longitudinally or along the length of the tape. Each of the bits is stored on the tape in the form of a signal representing the predetermined binary value, "1" or "0," of the bit. There are four lines and four channels of data bits, each of said lines and channels thereby containing four data bits to comprise a sixteen bit word. For purpose of explanation only, the bit labelled $X_{01}$ is the lowest order bit in the word and the sequentially higher order bits are labelled $X_{02}$–$X_{16}$ respectively. In addition to the channels and lines of data bits, there is a fifth channel containing a line parity bit for each line of data bits and a fifth line containing a channel parity bit for each channel of data bits. The line parity bits are labelled $PL_1$–$PL_4$ corresponding respectively to lines 1–4 of data bits, and the channel parity bits are labelled $PC_1$–$PC_4$ corresponding respectively to channels 1–4 of data bits. In addition, there is a further parity bit which serves a dual function in providing a parity bit for the line-parity channel, channel 5, and for the channel-parity line, line 5. In the arrangement described, it can be seen that each of the data bits $X_{01}$–$X_{16}$ has a unique line and channel coordinate position. For example, bit $X_{05}$ is located at the coordinate position of line 2 and channel 1, and $X_{11}$ has the coordinate position of line 3, channel 3, so that each unique data bit has a unique line and channel coordinate position.

By means not shown, the tape 10 is transported in the direction of arrow 12 so as to convey the tape past tape reader 14. The tape reader is a transducing device which senses the bit signals previously stored on the magnetic tape and determines the binary value of the stored signals. As each line of bits is sensed by the tape reader, the signals from the tape reader representing the value of the sensed bits are transmitted over group 16 of five lead wires to the line parity-checking circuit 18. The line parity checking device determines whether or not a line parity error exists as each line is read and upon detection of a line parity error there results a line parity error signal on lead wire 20. In co-pending application by Jallen, Serial No. 714,890, assigned to the same assignees of the present application, there is described a circuit for performing the line parity check and for developing a parity error signal indicative of a parity error.

As each line of bits is sensed by the tape reader 14, a signal appears on lead wire 22 and is fed into the line counter 24. The line counter is thereby incremented or advanced by one as each line of bits is sensed. An output signal from the line counter, representing the count in said counter, appears on lead wire 26 and is transmitted to the five AND gates 28–36. Only one of the AND gates is enabled by the line counter at any given time and the AND gate corresponding to the line being sensed, as determined by the counter, is the one which is enabled by the line counter. In this manner a line parity error signal appearing on lead wire 20 is gated into one of the five line flip-flops 38–46 corresponding to the line which contains the detected parity error. Lead wires 48–54 carry the output of the line flip-flops into the translator 56. It should be noted that only the four line flip-flops corresponding to the four lines of data bits have an output going to the translator, whereas the fifth line flip-flop, 46, transmits an output over lead wire 56 into the OR circuit 58. The OR circuit is well known in the part and produces an output signal upon the occurrence of a signal on any input. Line 5 contains only the channel parity bits and does not include any data bits.

The signals sensed by tape reader 14 are also transmitted by group 60 of five lead wires to the channel parity checking circuit 62. Lead wires 64–72 comprise the group 60 and each of these lead wires carries the channel bit signals, as sensed by the tape reader, to the channel parity checking circuit 62. Each of these five lead wires 64–72 corresponds respectively to channels 1–5, that is, lead wire 64 feeds the signals sensed on channel 1 to circuit 62, lead wire 66 feeds the signals sensed on channel 2 to circuit 62, etc. The channel parity checking device 62 includes five flip-flops 74–82, corresponding respectively to channels 1 through 5. The operation of the channel parity checking device can best be explained by an example. The channel flip-flops are toggle flip-flops well known in the art which have two stable states and which have a single input. The presence of a "1" signal at the input to the flip-flop will cause it to change to its opposite state regardless of its previous state. Assume that the parity check is to be odd, that is, as previously described the parity bit is of such a value that an odd number of "1's" appears in the group of bits being checked. By means not shown, the channel flip-flops 74 through 82 are preset to the "1" state. As each bit in a given channel is sensed, its signal state is transmitted to the channel flip-flop associated with that channel via one of the wires 64–72. A "1" signal state of a bit causes the flip-flop to change state. Therefore, if there is an odd number of "1's" in the group of bits in all channels, the flip-flops will all be in the "0" state after all of the bits in the channel have been sensed, and therefore after all of the bits have been sensed a signal indicating the "0" state of the flip-flop will appear on output lead wires 84–92 to indicate that odd parity exists in every channel. If even parity exists in any channel, the channel flip-flop corresponding to that channel will be in the "1" state after all of the bits in that channel have been read, thereby providing a "1" signal on its associated output lead wire to indicate a parity error in that particular channel. After all lines have been sensed, an end-of-word signal from line counter 24 appears on lead wire 94, to enable AND gates 96–104. These AND gates are similar to the AND gates mentioned in reference to the output of the line parity check and are well known in the art and provide a "1" signal output when all input signals are "1's." Therefore there will appear at the output of the AND gate corresponding to the channel which contains a parity error, a "1" signal indicating the detection of a channel parity error. The outputs from AND gates 96–102 are transmitted to the translator 56 via lead wires 106–112 respectively. A "1" signal appearing on any one of these lead wires indicates a data channel parity error. Since channel 5 includes only the line parity bits, a "1" signal representing a channel 5 parity error will appear on lead wire 114, which provides a second input to the OR circuit 58.

The appearance of a parity error signal on any of the lead wires 48–54 and 106–112 which serve as inputs to translator 56, will result in an output data error signal from the translator 56 on lead wire 116. Additionally, if there is a single channel parity error signal input to the translator on one of the lead wires 106–112 and a single line parity error signal on one of the lead wires 48–54, an error correction signal will appear on one of the group, 118, of sixteen lead wires from the translator. The circuit in the translator for combining the signal inputs for providing a data error signal and an error correction signal will be described subsequently in more detail in relation to FIGURE 2.

FIGURE 1*a* shows an array of bits on a magnetic tape with arbitrarily selected binary values for the word or data bits. Each of the bits shown in FIGURE 1*a* corresponds to the word bit designation $X_{01}$–$X_{16}$ as previously described to constitute a sixteen bit word of binary value 0111100011001001, with the least significant bit, $X_{01}$, being the rightmost bit and the highest order bit, $X_{16}$, being the leftmost bit. The data bits are arranged in a 4 x 4 array of lines and channels. Continuing with the previous assumption, the parity check is to be based on odd parity, i.e., the parity bit value for each line and each channel is such that an odd number of "1's" appear in each group of bits in each line and in each channel. For example, the parity bit in channel 2, $PC_2$, is a "0" since a single "1" occurs in the data bits in that channel and the parity bit for line 1, $PL_1$, is a "1" since there are two "1's" in the data bits in that line. Inspection of all the lines and channels of bits in FIGURE 1*a* shows that there are an odd number of "1's" in all channels and lines, including the channel of line parity bits and the line of channel parity bits, channel 5 and line 5 respectively.

Assume that $X_{01}$, at the coordinate position of line 1 and channel 1, is in error so that it is a "0" instead of a "1" as shown. When the tape is transported past the tape reader the first line of bits is sensed by the tape reader 14. All of the bits in line 14 are sensed in parallel, that is simultaneously, and the signal values thereof are transmitted to the line parity check 18 via the five lead wires in group 16. Concurrently a signal is sent from the tape reader to the line counter 24 to increment the contents of the line counter from its preset zero count to a count of one. Additionally, the signal values of each channel bit in line 1 is transmitted from the tape reader to the associated channel parity check flip-flop in channel parity check 62 via lead wires 64–72. Since there now is an even number of "1's" in the group of bits comprising line 1, the line parity check 18 produces a line parity error signal on the lead wire 20 which is transmitted to AND circuits 28–36. With the line counter containing a count of one, AND circuit 28 is enabled so that the line parity error signal is transmitted to the line 1 flip-flop 38. The line flip-flops 38–46 are originally preset to the "0" state so that no output signal appears on the associated output lead wires therefrom, 48–56 respectively. When the line 1 flip-flop is set to a "1" by the line parity error signal, a "1" signal appears on the output lead wire therefrom, 48, and is fed into the translator 56.

With the channel parity check flip-flops 74–82 originally set to the "1" state, the "1" signal value of $PL_1$ will cause the channel 5 flip-flop 82 to change to the "0" state. Similarly the "1" signal value of bit $X_{04}$ in channel 4 will cause the flip-flop 80 to change to the "0" state. Since the remaining data bits in line 1, $X_{01}$–$X_{03}$, are all of the "0" signal value, their associated flip-flops 74, 76, and 78 respectively will remain in the "1" state. Since the line counter does not develop an end-of-word signal on lead wire 94 until all lines have been sensed, none of the AND gates 96–104 are enabled so that the "1" signals from the channel flip-flops 82 and 80 do not produce any output from the AND gates on lead wires 106–114.

As the tape is transported past the tape reader so that line 2 is sensed by the tape reader, the line parity check is performed as previously described and the line counter is incremented to the count of two. However, since no line parity error exists in line 2 there will be no line parity error signal on lead wire 20 so that the line flip-flops will retain their previous states. The signal values of the bits in line 2 will affect the channel flip-flops as follows: flip-flops 74 and 76 will retain their "1" state because of the "0's" of $X_{05}$ and $X_{06}$; flip-flop 78 will change to the "0" state due to the "1" signal value of data bit $X_{07}$; flip-flop 80 will change to the "1" state because of the "1" signal value of data bit $X_{08}$; and the "1" signal value of the line parity bit $PL_2$ in channel 5 will change flip-flop 82 to the "1" state. The remaining bits on the tape are read in the same serial line-parallel channel mode as described in relation to the sensing of lines 1 and 2. That is, the series of lines are read sequentially and all bits in each line, one bit per channel, are sensed simultaneously. No limitation to this type of readout is intended since there are many possible readout modes which can be utilized within the teachings of this invention. The sensing of line 3 will again result in no line parity error signal and will result in channel flip-flops 74 and 76 and 82 remaining in the "1" state, flip-flop 80 changing to the "0" state and flip-flop 78 remaining in the "0" state. After the sensing of lines 4 and 5, neither of which contains a line parity error, the channel parity flip-flops 74–82 will be respectively in the following states: 1, 0, 0, 0, 0 therefore flip-flop 74 will have a "1" signal on its output lead wire 84 into AND circuit 96. The end-of-word signal on lead wire 94 from the line counter, which is generated by the line counter when the last line of bits is read, that is when line 5 is sensed, enables all of the AND circuits 96–104 thereby providing a "1" signal on lead wire 106 into the translator 56 which indicates a channel parity error in channel 1. As will be described subsequently in detail, the occurrence of a "1" signal on any of the inputs to the translator will result in a data error signal occurring on lead wire 116 from the translator indicating the presence of an error in the data bits. Additionally, since only a single error is present in the example described, there will be produced by the translator an error correction signal from the translator on one of the sixteen lead wires comprising group 118. The latter can then be used to correct the unique bit, $X_{01}$, which is in error. This correction circuit will also be described subsequently in more detail. It can be seen that if one of the parity bits were in error, that is, one of the bits in channel 5 or line 5, there would result an input signal to OR circuit 58 via lead wires 114 or 56 or both which would produce a signal indicating the parity bit error on lead wire 120 from the OR circuit. It can be seen that if two of the bits in a single line were in error, for example, if $X_{01}$ were a "0" and $X_{02}$ were a "1," line parity check 18 would not detect the presence of any line parity errors, however, the channel parity check would detect a channel parity error in channel 1 and in channel 2. Likewise, if two bits were in error in the same channel, for example, if $X_{01}$, were a "0" and $X_{05}$ were a "1," the channel parity check would not detect these errors, however, the line parity check would detect errors in lines 1 and 2.

It is proper here to point out the special combination of data bit errors that would not be detected by this invention and this likewise can best be shown by an example. If $X_{01}$ and $X_{02}$ in line 1 were both in error, and if $X_{05}$ and $X_{06}$ in line 2 were both in error, there would be two errors in channel 1 and in channel 2, and these errors can be thought of as having coordinate line and channel positions comprising the four corners of a rectangle. The line parity check and the channel parity check in this specific type of error combination would not detect the presence of parity error. The probability of such a combination occurring is extremely remote.

In FIGURE 1 the four lead wires comprising group 122 transmit the four data bits of each line as they are sensed by the tape reader to the word assembly circuit of FIGURE 3 and the end-of-line signal from the line counter is transmitted on lead wire 124 to the shift control circuit in FIGURE 3 as will be described subsequently in more detail. As each line of bits is read, the four data bits are transmitted to a shiftable sixteen bit storage register to be assembled into a single sixteen bit word for eventual use by a utilization device, such as a digital computer.

Figure 2:
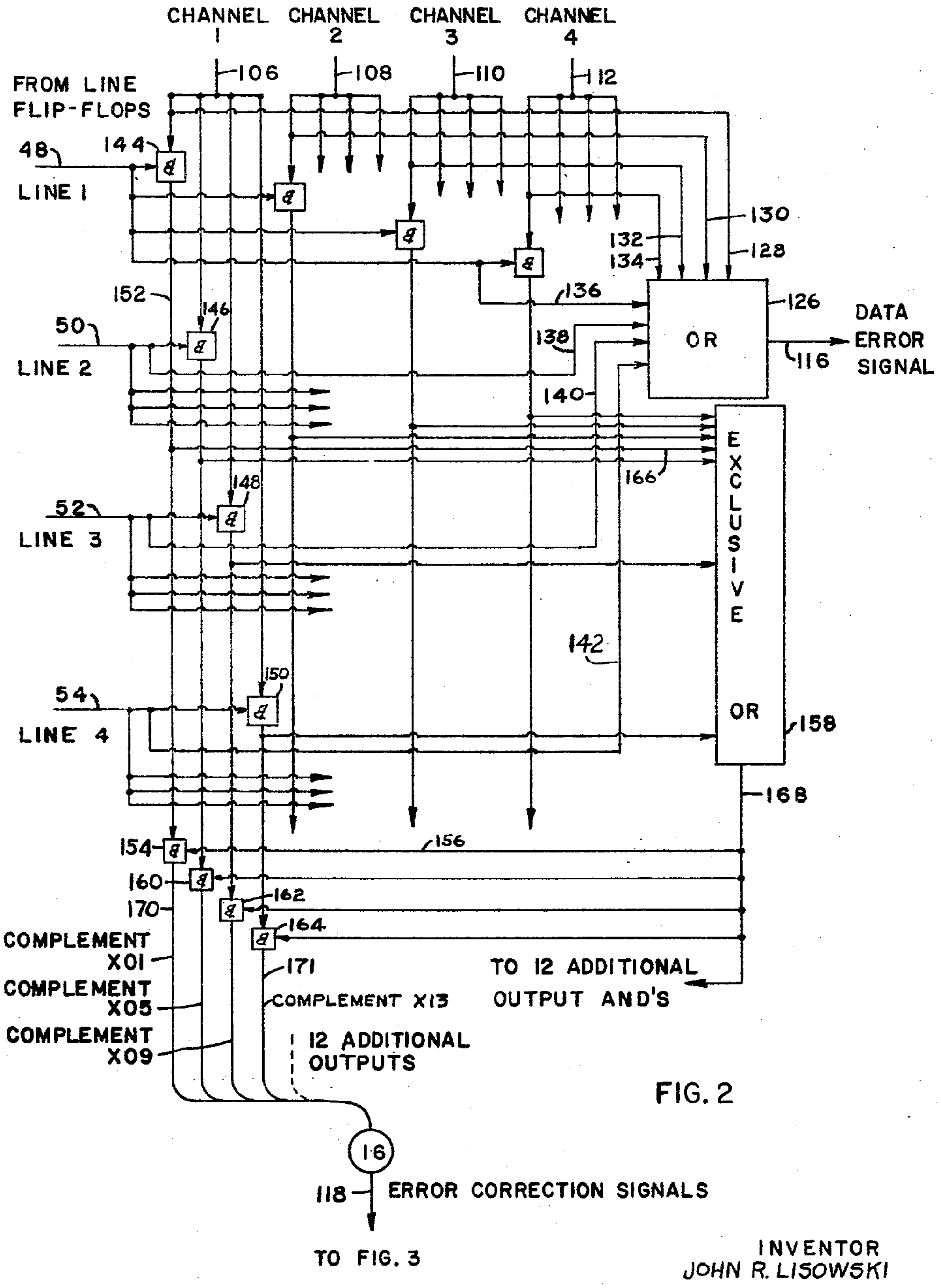
FIGURE 2 shows in detail the translator of FIGURE 1.

FIGURE 2 shows part of the detailed circuitry of the translator 56. The inputs from the channel parity checking circuit are labelled 106–112 and the inputs from the line parity checking circuit are labelled 48–54, corresponding to the input lead wires in FIGURE 1. For the purpose of clarity, only a portion of the detailed circuitry of the translator is shown in FIGURE 2. However, the description of the portion shown is sufficient to describe the entire circuitry because of the similarity throughout the translator. OR circuit 126 is a circuit that is well known in the art which will produce an output signal upon occurrence of a signal on any input thereto. Lead wires 128–134 are connected to translator inputs 106–112 respectively, and thereby provide any channel parity error signal as inputs to the OR circuit 126. Lead wires 136–142 are connected to translator inputs 48–54 respectively and convey any of the line parity error signals into the OR circuit 126. In the previous example utilized in describing the operation of FIGURE 1 there is an assumed error in bit $X_{01}$ which, as described above, results in a line parity error signal appearing on lead wire 48 and a channel parity error signal appearing on lead wire 106 into the translator. Since these parity error signals appear on inputs 128 and 136 to OR circuit 126, there results a data error signal on lead wire 116 to indicate a parity error in the data word.

In addition to the translator inputs being combined in OR circuit 126 they are also combined in the translator through a plurality of AND circuits. The AND combinations are such that each channel input to the translator is ANDed with each of the line inputs to the translator. For example, translator input 106, corresponding to channel 1, is combined with translator input 48, corresponding to line 1, in AND circuit 144. In addition the same channel input is combined in AND circuit 146 with translator input 50, corresponding to line 2; combined in AND circuit 148 with translator input 52, corresponding to line 3; and combined with translator 54, corresponding to line 4, in AND circuit 150. Similar combinations are repeated for translator inputs 108, 110 and 112 corresponding to channels 2, 3, and 4 so that the translator contains a total of sixteen AND's, which can be considered as translator input AND's. The number of input AND's of course depends on the number of channels and lines and is equal to sixteen in this embodiment because of the arbitrarily selected 4 x 4 array of data bits. As with the previously described AND circuits, the AND circuits in the translator provide an output signal only when all inputs thereto contain a signal. Since under the previously assumed error condition a channel parity error signal is on input 106 and a line parity error signal is on input 48, AND circuit 144 will have an output on lead wire 152. None of the other input AND circuits have an output signal since not more than one input to each contains a signal. For example, even though AND circuit 146 has an input signal from translator input 106 it will have no output signal since the other input to AND 146 from translator input 50 will not have a signal. The signal appearing on lead wire 152, being developed from the AND combination of a parity error signal on channel 1 and a parity error signal on line 1 indicates the presence of an error at the corresponding line and channel coordinate position of the data bit array which, as previously described in relation to FIGURE 1, corresponds to bit $X_{01}$. This signal appearing on 152 can then be utilized to correct the unique bit, $X_{01}$, which is in error.

Lead wire 152 serves as one input to translator output AND circuit 154 and the other input to said output AND circuit is via lead wire 156 which is an output from the exclusive OR circuit 158. The exclusive OR circuit is of a type well known in the art which will produce an output signal if one and only one of the inputs thereto contains a signal. The exclusive OR circuit has sixteen inputs, not all of which are shown for the sake of clarity. The sixteen inputs correspond to the outputs from the sixteen translator input AND circuits which perform the combination of all line and channel translator inputs as previously described. If more than one of the sixteen input AND circuits have a signal output therefrom, there will result no output signal from the exclusive OR circuit 158 whereas if only one of the sixteen input AND circuits has a signal output therefrom, then the exclusive OR circuit will provide an output.

In addition to the output lead wire 152 of input AND 144 being combined with the output from the exclusive OR circuit 158 by output AND circuit 154, each of the output lead wires from the fifteen remaining input AND circuits are likewise combined in output AND circuits with the output of the exclusive OR 158. Again, for the sake of clarity, only four of these output AND circuits 154, 160, 162, and 164 are shown in the figure but this is sufficient to indicate all similar combinations. Since under the example error condition previously stated lead wire 152 contains a signal and none of the other outputs from the input AND circuits has a signal, exclusive OR circuit 158 will have a single input on lead wire 166 which is connected to lead wire 152. This will result in a signal output from the exclusive OR circuit on lead wire 168 which is common to all of the translator output AND circuits. Since both of the inputs to AND circuit 154 have signals thereon, lead wire 170 from output AND 154 will have a signal, whereas none of the other translator output AND circuits will have signals on both inputs so that only one error correction output from the translator will have a signal.

To further describe the function of the exclusive OR circuit in inhibiting error correction output signals from the translator when more than a single parity error is detected, assume that two bits, for example $X_{01}$ and $X_{06}$ appearing at the coordinate positions of line 1–channel 1 and line 2–channel 2 respectively, are in error. The parity error detection apparatus described in FIGURE 1 will produce line parity error signals for lines 1 and 2 and channel parity error signals for channels 1 and 2 which will result in signals appearing on translator inputs 106 and 108 as well as translator inputs 48 and 50. The translator input AND circuits corresponding to the ANDing of line 1 and channel 1, line 1 and channel 2, line 2 and channel 1, and line 2 and channel 2 will all have output signals therefrom which would indicate the presence of four errors in the data bits whereas actually only two errors exist. The exclusive OR circuit 158 inhibits the occurrence of an error correction signal from the output of the translator since more than a single input to the exclusive OR circuit will contain a signal so that no output will appear on lead wire 168 from the exclusive OR circuit so that none of the translator output AND circuits will be enabled. In this manner erroneous error correction signals are inhibited. Of course there will be a data error signal appearing on lead wire 116 from the OR circuit 126.

Figure 3:
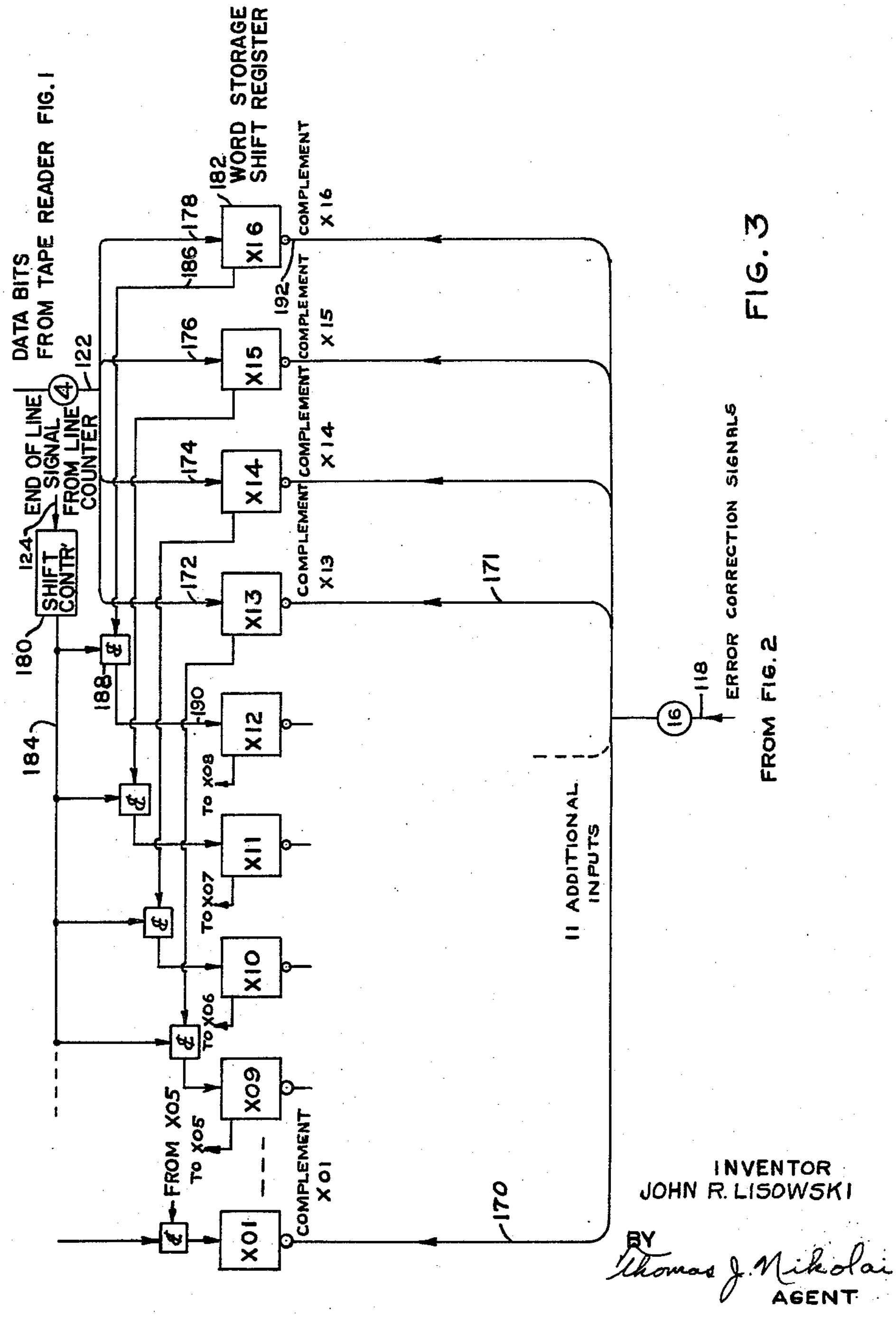
FIGURE 3 shows in block diagram form apparatus for data bit correction.

In the error correction circuit of FIGURE 3 there is shown a sixteen stage binary word storage shift register, each of the bistable stages being designated by a rectangular box, for example 182, and labelled $X_{01}$–$X_{16}$. Only nine of the stages are shown but this is sufficient to describe the operation of the entire error correction circuit since the error correction for one stage is duplicated in all other stages. The register stages have the same designation as the data bits shown in FIGURE 1 since in this embodiment, the data bits are assembled into the word storage register such that each bit stored on the magnetic tape of FIGURE 1 is stored in a corresponding stage of the word register. The particular apparatus shown in FIGURE 3 for performing word assembly is not considered a part of this invention but will be described briefly to indicate a word assembly means which can be used in conjunction with this invention. The principal function of the word assembly circuit shown in the embodiment of this invention is to assemble the data bits into a single word so that the word can be transmitted in a parallel mode, all bits simultaneously, to some utilization device such as a digital computer. It will be obvious to those of ordinary skill in the art that this invention can be adapted to other word assembly circuits to perform the error correction or can be adapted for error correction even where no word assembly circuit is utilized. The group 122 of four lead wires shown in FIGURE 1 is the same as that group similarly labelled in FIGURE 3. Additionally lead wire 124 carrying the end-of-line signal from line counter 24 in FIGURE 1 is the same as that lead wire similarly labelled in FIGURE 3 and shown as the input to shift control 180. Lead wires 172–178 comprise the four lead wires of group 122 and provide inputs to stages $X_{13}$–$X_{16}$ respectively. Each of the register stages has an output lead wire, such as 186, through which the signal value of the stage may be transmitted four stages to the left through an AND circuit, such as 188, which can be referred to as the shift control AND circuit. Each of the shift control AND circuits has an enabling input from the shift control 180 output appearing on lead wire 184. For example, stage $X_{16}$ has an output lead wire 186 which is an input into the shift control AND 188. The output of AND 188 on lead wire 190 is an input to register stage $X_{12}$. In a similar manner stage $X_{15}$ has an output through an AND into stage $X_{11}$ and all of the remaining stages likewise have outputs which are transmitted four stages to the left via the shift control AND circuits. In addition each stage has a complement input, such as 192, which is appropriately labelled in the figure. As is well known in the art, a signal appearing at the complement input will cause the state of the stage to change from its existing bistable state to the other bistable state. The group 118 of sixteen lead wires from the translator in FIGURE 1 and FIGURE 2 corresponds to the group similarly labelled in FIGURE 3 and serves as the input lead wires to the complement inputs of each of the register stages.

As each line of bits is read from the tape, as described previously in relation to FIGURE 1, the four data bits per line are transmitted via lead wires 172–178 to register stages $X_{13}$–$X_{16}$. For example, as line 1 is sensed, bits $X_{01}$–$X_{04}$ appear as inputs to register stages $X_{13}$–$X_{16}$ respectively. When line 2 is sensed an end-of-line signal from the line counter appears at the input to shift control 180 via lead wire 124. The shift control output in response to the end-of-line signal enables all of the shift control AND circuits so that the bits $X_{01}$–$X_{04}$ in stages $X_{13}$–$X_{16}$ are transmitted to stages $X_{09}$–$X_{12}$ respectively and the data bits of line 2 are transmitted to stages $X_{13}$–$X_{16}$. When line 3 is sensed the signal value of the bits stored in register stages $X_{09}$–$X_{12}$ are shifted to the left to stages $X_{05}$–$X_{08}$ respectively, the signal value of the bits stored in stages $X_{13}$–$X_{10}$ are shifted to stages $X_{09}$–$X_{12}$, and the data bits in line 3 are stored in stages $X_{13}$–$X_{16}$. The above sequence of operation is repeated until all of the data bits have been sensed and are assembled in the word storage register with each of the bits stored in a corresponding stage of the word storage register.

As described in relation to FIGURE 2, the occurrence of a single error in the data bits will result in an error correction signal on one of the sixteen error correction ouptut lead wires from the translator corresponding to the unique channel-line coordinate position of the erroneous bit in the array of bits on the magnetic tape. In the single error example previously assumed in which bit $X_{01}$, at the coordinate position of line 1 and channel 1, is in error there will be an error correction signal on the translator output lead wide 170 in FIGURES 2 and 3. This output lead wire, corresponding to the input lead wire to the complement input of word storage register stage $X_{01}$, transmits a signal to the complement input of the register stage to change it from its erroneous "0" signal value state to the correct "1" signal value. Likewise if the single error had occurred in bit $X_{13}$, at coordinate position of line 4 and channel 1, an error correction signal would appear on output lead wire 171 which corresponds to the lead wire to the complement input of the storage register stage $X_{13}$ so that the bit $X_{13}$ would then be changed to its correct signal value. In the event of the occurrence of more than a single data bit error which would be detected by the line and channel parity error checking apparatus in FIGURE 1, as previously described the translator exclusive OR circuit of FIGURE 2 would inhibit the occurrence of an error correction signal so that no signals would appear at the complement inputs to the register stages.

Although there is described above an embodiment of an error correction circuit, it is obvious that the error correction signal developed by the translator in response to the detection of a single data bit error can be utilized in a variety of circuits to perform error correction. For example, the error correction signal could be temporarily stored and subsequently used to correct the erroneous bit or could be used to control the transmission of the data bits from the storage register to the utilization device.

It is understood that suitable modifications may be made in the structure as disclosed provided such modifications come within the spirit and scope of the appended claims.

Having now, therefore, fully illustrated and described my invention, what I claim to be new and desire to protect by Letters Patent is:

1. For a binary-coded data-processing system wherein the data bits are arranged in a coordinate system of lines and channels such that each data bit has a unique line and channel coordinate position, error detection and correction apparatus comprising: a line of parity bits having a parity bit for each channel of bits based upon modulo 2 summing; a channel of parity bits having a parity bit for each line of bits based upon modulo 2 summing, said line and channel of parity bits including one parity bit common to each; bit reading means for sensing all bits; line parity error detection means responsive to said reading means for developing line parity error signals corresponding to the lines containing detected parity errors; a plurality of first AND circuits corresponding to respective lines and connected to said line parity error detection means whereby detection of an error in a line activates an associated AND circuit; a plurality of first flip-flops connected to respective AND circuits; a line counter connected to said reading means and said AND circuits whereby detection of an error in a checked line activates an associated AND circuit causing a corresponding flip-flop to change to a second stable state; channel parity error detection means responsive to said reading means for developing channel parity error signals corresponding to the channels containing detected parity errors including a plurality of second flip-flops connected to the reading means; an end-of-word lead line extending from the line counter; a plurality of second AND circuits connected to the second flip-flops and to said lead line whereby detection of channel errors causes corresponding second flip-flops to change stable states and termination of reading all lines causes the second AND circuits associated with said second flip-flops to be activated to produce an output signal; a first OR circuit connected to one of said second AND circuits corresponding to a parity bit channel and to one of said first flip-flops corresponding to a parity bit line for combining said parity error signals corresponding to said channels of data bits and said lines of data bits for providing a data bit error signal; a third plurality of AND circuits for combining each of said parity error signals corresponding to said channels of data bits with each of said parity error signals corresponding to said lines of data bits; an exclusive OR circuit responsive to said third plurality of AND circuits for providing an enable signal when only one of said third AND circuits combines both parity error signals thereto; a fourth plurality of AND circuits responsive to said third AND circuits and said enable signal for providing an error correction signal; a data bit storage register having a stage for each data bit, each of said stages corresponding to the unique line and channel coordinate position of each data bit; means responsive to said bit sensing means for storing each sensed data bit into its corresponding stage in said storage register; and means responsive to said error correction signal for correcting the storage register stage corresponding to the erroneous data bit.

2. For a binary-coded data-processing system wherein the data bits are arranged in an array of lines and channels wherein each line and channel coordinate point contains a unique data bit comprising: a line-parity channel having a parity bit for each line of bits based upon modulo 2 summing; a channel-parity line having a parity bit for each channel of bits based upon modulo 2 summing, said line-parity channel thereby containing a parity bit for each line of data bits and for said channel-parity line and said channel thereby containing a parity bit for each channel of data bits and for said line-parity channel; means for sensing all bits; line parity checking means responsive to said sensed bits for detecting parity errors in each line of bits and for developing line parity error signals corresponding to the lines containing the detected parity error; a plurality of first AND circuits corresponding to respective lines and connected to said line parity error detection means whereby detection of an error in a line activates an associated AND circuit; a plurality of first flip-flops connected to respective AND circuits; a line counter connected to said reading means and said AND circuits whereby detection of an error in a checked line activates an associated AND circuit causing a corresponding flip-flop to change to a second stable state; channel parity checking means responsive to said sensed bits for detecting parity errors in each channel of bits and for developing channel parity error signals corresponding to the channels containing the detected parity error including a second plurality of flip-flops connected to the reading means; an end-of-word lead line extending from the line counter; a plurality of second AND circuits connected to the second flip-flops and to said lead line whereby detection of channel errors causes corresponding second flip-flops to change stable-states and termination of reading all lines causes the second AND circuits associated with said second flip-flops to be activated to produce an output signal; first means for providing a parity bit error signal in response to said parity error signals corresponding to said line-parity channel or said channel-parity line; means for providing a data error signal in response to any of said parity error signals corresponding to said channels of said data bits and said lines of data bits; means for translating a single data channel parity error signal and a single data line parity error signal into an error correction signal corresponding to the line and channel coordinate position of said single data line parity error and said single data channel parity error.

3. For a binary-coded data-processing system wherein the data bits are arranged in a coordinate system of lines and channels such that each data bit has a unique line and channel coordinate position comprising: a line of parity bits having a parity bit for each channel of bits based upon modulo 2 summing; a channel of parity bits having a parity bit for each line of bits based upon modulo 2 summing, said line and channel of parity bits including one parity bit common to each; bit reading means for sensing all bits; line parity error detection means responsive to said reading means for developing line parity error signals corresponding to the lines containing detected parity errors; a plurality of first AND circuits corresponding to respective lines and connected to said line parity error detection means whereby detection of an error in a line activates an associated AND circuit; a plurality of first flip-flops connected to respective AND circuits; a line counter connected to said reading means and said AND circuits whereby detection of an error in a checked line activates an associated AND circuit causing a corresponding flip-flop to change to a second stable-state; channel parity error detection means responsive to said reading means for developing channel parity error signals corresponding to the channels containing detected parity errors including a plurality of second flip-flops connected to the reading means; an end-of-word lead line extending from the line counter; a plurality of second AND circuits connected to the second flip-flops and to said lead line whereby detection of channel errors causes corresponding second flip-flops to change stable states and termination of reading all lines causes the second AND circuits associated with said second flip-flops to be activated to produce an output signal; a first OR circuit connected to one of said second AND circuits corresponding to a parity bit channel and to one of said first flip-flops corresponding to a parity bit line for combining said parity error signals corresponding to said channels of data bits and said lines of data bits for providing a data bit error signal.

4. For a binary-coded data-processing system wherein the data bits are arranged in a coordinate system of lines and channels such that each data bit has a unique line and channel coordinate position comprising: a line of parity bits having a parity bit for each channel of bits based upon modulo 2 summing; a channel of parity bits having a parity bit for each line of bits based upon modulo 2 summing, said line and channel of parity bits including one parity bit common to each; bit reading means for sensing all bits; line parity error detection means responsive to said reading means for developing line parity error signals corresponding to the lines containing detected parity errors; a plurality of first AND circuits corresponding to respective lines and connected to said line parity error detection means whereby detection of an error in a line activates an associated AND circuit; a plurality of first flip-flops connected to respective AND circuits; a line counter connected to said reading means and said AND circuits whereby detection of an error in a checked line activates an associated AND circuit causing a corresponding flip-flop to change to a second stable state; channel parity error detection means responsive to said reading means for developing channel parity error signals corresponding to the channels containing detected parity errors including a plurality of second flip-flops connected to the reading means; an end-of-word lead line extending from the line counter; a plurality of second AND circuits connected to the second flip-flops and to said lead line whereby detection of channel errors causes corresponding second flip-flops to change stable states and termination of reading all lines causes the second AND circuits associated with said second flip-flops to be activated to produce an output signal; a first OR circuit connected to one of said second AND circuits corresponding to a parity bit channel and to one of said first flip-flops corresponding to a parity bit line for combining said parity error signals corresponding to said channels of data bits and said lines of data bits for providing a data bit error signal; a third plurality of AND circuits for combining each of said parity error signals corresponding to said channels of data bits with each of said parity error signals corresponding to said lines of data bits; an Exclusive OR circuit responsive to said third plurality of AND circuits for providing an enable signal when only one of said third AND circuits combines both parity error signals thereto; a fourth plurality of AND circuits responsive to said third AND circuits and said enable signal for providing an error correction signal.

References Cited by the Examiner

UNITED STATES PATENTS

| | | | |
|---|---|---|---|
| 2,951,229 | 8/60 | Goldstein | 340—147 |
| 2,977,047 | 2/61 | Bloch | 235—153 |

OTHER REFERENCES

Pages 185 and 192, Arithmetic Operations in Digital Computers by R. K. Richards.

MALCOLM A. MORRISON, *Primary Examiner.*
IRVING L. SRAGOW, *Examiner.*